(12) United States Patent
Amitai (10) Patent No.: US 12,092,825 B2
(45) Date of Patent: *Sep. 17, 2024

(54) COMPACT HEAD-MOUNTED DISPLAY SYSTEM HAVING UNIFORM IMAGE

(71) Applicant: Lumus Ltd., Ness Ziona (IL)

(72) Inventor: Yaakov Amitai, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 64 days.

This patent is subject to a terminal disclaimer.

(21) Appl. No.: 17/993,056

(22) Filed: Nov. 23, 2022

(65) Prior Publication Data

US 2023/0088054 A1 Mar. 23, 2023

Related U.S. Application Data

(63) Continuation of application No. 17/060,268, filed on Oct. 1, 2020, now Pat. No. 11,531,201, which is a (Continued)

(30) Foreign Application Priority Data

Feb. 19, 2015 (IL) .......................................... 237337

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC ................ G02B 27/01; G02B 27/0101; G02B 27/0149; G02B 27/017; G02B 27/0172;
(Continued)

(56) References Cited

U.S. PATENT DOCUMENTS 6,805,490 B2 * 10/2004 Levola ................. G02B 5/1866
359/24
7,589,901 B2 9/2009 DeJong et al.
(Continued)

FOREIGN PATENT DOCUMENTS

JP 2006003872 A 1/2006
WO 2006098097 9/2006

*Primary Examiner* — Nicholas R. Pasko
(74) *Attorney, Agent, or Firm* — Rivka Friedman (57) ABSTRACT

There is disclosed an optical device, including a light-transmitting substrate having an input aperture, an output aperture, at least two major surfaces and edges, an optical element for coupling light waves into the substrate by total internal reflection, at least one partially reflecting surface located between the two major surfaces of the light-transmitting substrate for partially reflecting light waves out of the substrate, a first transparent plate, having at least two major surfaces, one of the major surfaces of the transparent plate being optically attached to a major surface of the light-transmitting substrate defining an interface plane, and a beam-splitting coating applied at the interface plane between the substrate and the transparent plate, wherein light waves coupled inside the light-transmitting substrate are partially reflected from the interface plane and partially pass the through.

17 Claims, 11 Drawing Sheets

Related U.S. Application Data continuation of application No. 15/549,603, filed as application No. PCT/IL2016/050158 on Feb. 10, 2016, now abandoned.

(51) Int. Cl.
*G02B 27/14* (2006.01)
*G02B 27/28* (2006.01)
*G02B 27/00* (2006.01)

(52) U.S. Cl.
CPC ....... *G02B 27/0176* (2013.01); *G02B 27/142* (2013.01); *G02B 27/145* (2013.01); *G02B 27/148* (2013.01); *G02B 27/283* (2013.01); *G02B 27/0081* (2013.01); *G02B 2027/0118* (2013.01); *G02B 2027/012* (2013.01); *G02B 2027/0125* (2013.01); *G02B 2027/015* (2013.01); *G02B 2027/0152* (2013.01); *G02B 2027/0178* (2013.01)

(58) Field of Classification Search
CPC ............ G02B 27/0176; G02B 27/0179; G02B 2027/0123; G02B 2027/013; G02B 27/283; H04N 5/7491; H04N 13/044
USPC ...... 359/13–14, 629–633; 345/7–9; 348/115; 349/11
See application file for complete search history.

(56) References Cited

U.S. PATENT DOCUMENTS

| | | |
|---|---|---|
| 7,778,508 B2 | 8/2010 | Hirayama |
| 8,432,614 B2 * | 4/2013 | Amitai ................. G02B 6/0056 359/633 |
| 8,531,773 B2 * | 9/2013 | DeJong ............. G02B 27/0101 359/630 |
| 9,952,428 B2 | 4/2018 | Dominici et al. |
| 11,531,201 B2 * | 12/2022 | Amitai ................. G02B 27/145 |
| 2008/0094586 A1 * | 4/2008 | Hirayama .......... G02B 27/0172 353/98 |
| 2009/0015929 A1 * | 1/2009 | DeJong ............. G02B 27/0081 359/636 |
| 2009/0122414 A1 | 5/2009 | Amitai |
| 2010/0111472 A1 | 5/2010 | DeJong |
| 2012/0044572 A1 * | 2/2012 | Simmonds ........... G02B 6/0061 385/37 |
| 2013/0242392 A1 * | 9/2013 | Amirparviz .......... G02B 5/3025 359/485.05 |
| 2013/0250431 A1 * | 9/2013 | Robbins ............. G02B 27/0172 359/633 |
| 2016/0018658 A1 | 1/2016 | Machida et al. |
| 2017/0285346 A1 | 10/2017 | Pan |
| 2017/0285348 A1 | 10/2017 | Ayres et al. |
| 2018/0373115 A1 | 12/2018 | Brown et al. |

\* cited by examiner

COMPACT HEAD-MOUNTED DISPLAY SYSTEM HAVING UNIFORM IMAGE

FIELD OF THE INVENTION

The present invention relates to substrate-guided optical devices, and particularly to devices which include a plurality of reflecting surfaces carried by a common light-transmissive substrate, also referred to as a light-guide optical element (LOE).

The invention can be implemented to advantage in a large number of imaging applications, such as, for example, head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the important applications for compact optical elements is in head-mounted displays, wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. Unfortunately, as the desired field-of-view (FOV) of the system increases, such a conventional optical module becomes larger, heavier, bulkier, and therefore, even for a moderate performance device, is impractical. This is a major drawback for all kinds of displays, hut especially in head-mounted applications, wherein the system must necessarily be as light and as compact as possible.

The strive for compactness has led to several different complex optical solutions, all of which, on one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive, even to small movements of the optical system relative to the eye of the viewer, and do not allow sufficient pupil motion for conveniently reading text from such displays.

The teachings included in Publication Nos. WO01/95027, WO03/081320, WO2005/024485, WO2005/024491, WO2005/024969, WO2005/124427, WO2006/013565, WO2006/085309, WO2006/085310, WO2006/087709, WO2007/054928, WO2007/093983, WO2008/023367, WO2008/129539, WO2008/149339, WO2013/175465, IL 232197, IL 235642, IL 236490 and IL 236491, all in the name of Applicant, are herein incorporated by references.

DISCLOSURE OF THE INVENTION

The present invention facilitates the design and fabrication of very compact LOEs for, amongst other applications, head-mounted displays. The invention allows relatively wide FOVs together with relatively large eye-motion-box values. The resulting optical system offers a large, high-quality image, which also accommodates large movements of the eye. The optical system offered by the present invention is particularly advantageous because it is substantially more compact than state-of-the-art implementations, and yet it can be readily incorporated even into optical systems having specialized configurations.

A further application of the present invention is to provide a compact display with a wide FOV for mobile, hand-held applications such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. The present invention thereby enables the viewing of the digital content of a full format internet page within a small, hand-held device, such as a cellular phone.

The broad object of the present invention is therefore to alleviate the drawbacks of state-of-the-art compact optical display devices and to provide other optical components and systems having improved performance, according to specific requirements.

In accordance with the present invention there is therefore provided an optical device, comprising a light-transmitting substrate having an input aperture, art output aperture, at least two major surfaces and edges, an optical element for coupling light waves into the substrate by total internal reflection, at least one partially reflecting surface located between the two major surfaces of the light-transmitting substrate for partially reflecting light waves out of the substrate, a first transparent plate., having at least two major surfaces, one of the major surfaces of the transparent plate being optically attached to a major surface of the light-transmitting substrate defining an interface plane, and a beam-splitting coating applied at the interface plane between the substrate and the transparent plate, wherein light waves coupled inside the light-transmitting substrate arc partially reflected from the interface plane and partially pass therethrough.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings.

DETAILED DESCRIPTION OF EMBODIMENTS

Figure 1:
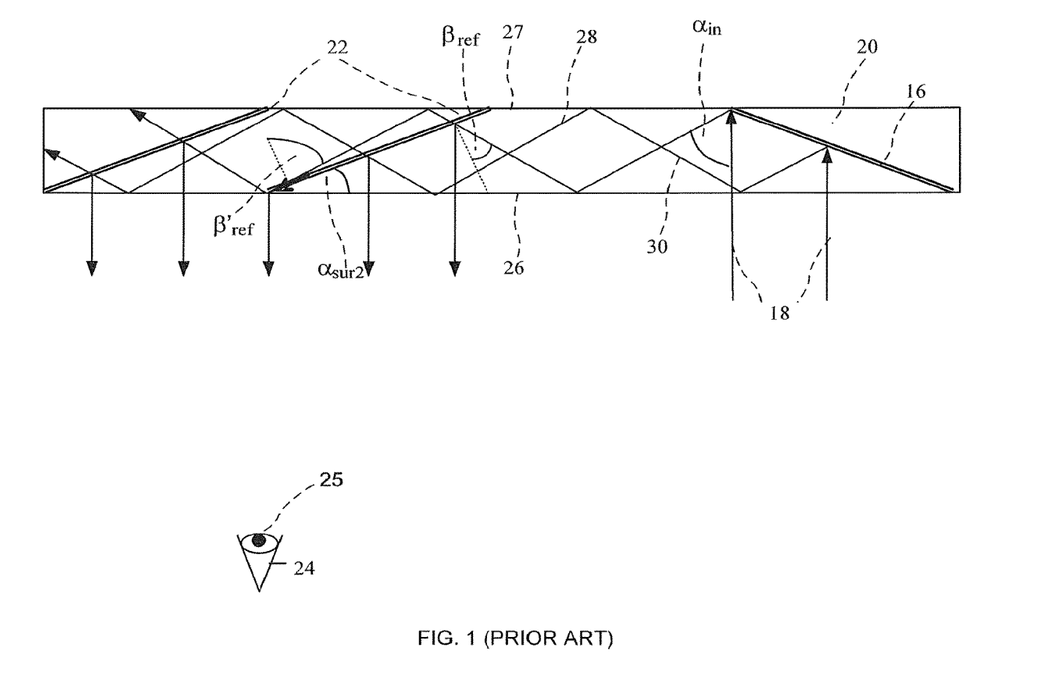
FIG. 1 is a side view of an exemplary prior art light-guide optical element.

FIG. 1 illustrates a sectional view of a light-guide optical element (LOE), according to the present invention. The first reflecting surface 16 is illuminated by a collimated display 18 emanating from a light source (not shown) located behind the device. The reflecting surface 16 reflects the incident light from the source such that the light is trapped inside a planar substrate 20 by total internal reflection. After several reflections off the surfaces 26, 27 of the substrate, the trapped light waves reach an array of partially reflecting surfaces 22, which couple the light out of the substrate into the eye 24, having a pupil 25, of a viewer. Herein, the input surface of the LOE will be defined as the surface through which the input light waves enter the LOE and the output surface of the LOE Will be defined as the surface through which the trapped light waves exit the LOE. In addition, the input aperture of the LOE will be referred to as the part of the input surface through which the input light waves actually pass while entering the LOE, and the output aperture of the LOE will be referred to as a part of the output surface through which the output light waves actually pass while exiting the LOE. In the case of the LOE illustrated in FIG. 1, both of the input and the output surfaces coincide with the lower surface 26, however, other configurations are envisioned in which the input and the image light waves could be located on opposite sides of the substrate, or on one of the edges of the LOE. Assuming that the central light wave of the source is coupled out of the substrate 20 in a direction normal to the substrate surface 26, the partially reflecting surfaces 22 are flat, and the off-axis angle of the coupled light wave inside the substrate 20 is then the angle $\alpha_{sur2}$ between the reflecting surfaces and the normal to the substrate plane is:

$$\alpha_{sur2} = \frac{\alpha_{in}}{2} \tag{1}$$

As can be seen in FIG. 1, the trapped rays arrive at the reflecting surfaces from two distinct directions 28, 30. In this particular embodiment, the trapped rays arrive at the partially reflecting surface 22 from one of these directions 28 after an even number of reflections from the substrate surfaces 26 and 27, wherein the incident angle βref between the trapped ray and the normal to the reflecting surface is:

$$\beta_{ref} = \alpha_{in} - \alpha_{sur2} = \frac{\alpha_{in}}{2} \tag{2}$$

The trapped rays arrive at the reflecting surface from the second direction 30 after an odd number of reflections from the substrate surfaces 26 and 27, where the off-axis angle is α'in=180°-αin and the incident angle between the trapped ray and the normal to the reflecting surface is;

$$\beta'_{ref} = \alpha'_{in} - \alpha_{sur2} = -\alpha_{in} - \alpha_{sur2} = -\frac{3\alpha_{in}}{2} \tag{3}$$

wherein the minus sign denotes that the trapped ray impinges on the other side of the partially reflecting surface 22.

As illustrated in FIG. 1, for each reflecting surface, each ray first arrives at the surface from the direction 30, wherein some of the rays again impinge on the surface from direction 28. In order to prevent undesired reflections and ghost images, it is important that the reflectance be negligible for the rays that impinge on the surface having the second direction 28.

Figure 2A:
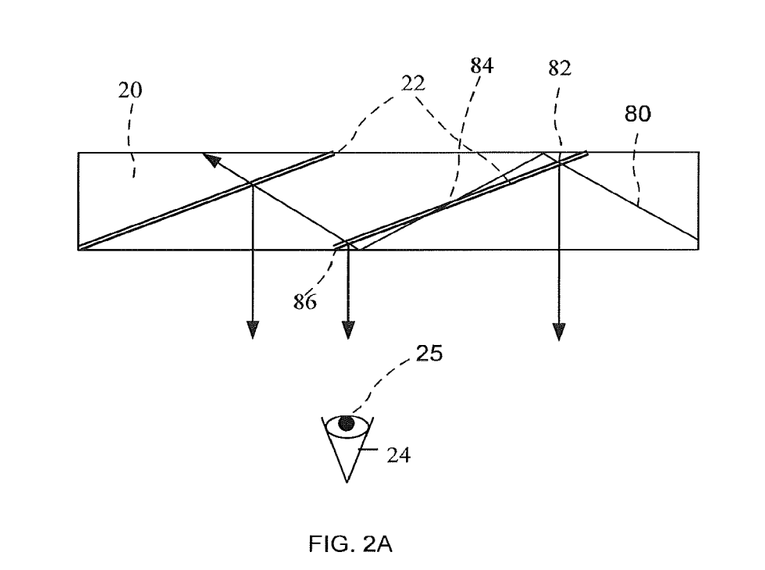
FIGS. 2A and 2B are diagrams illustrating detailed sectional views of an exemplary array of selectively reflective surfaces.
Figure 2B:
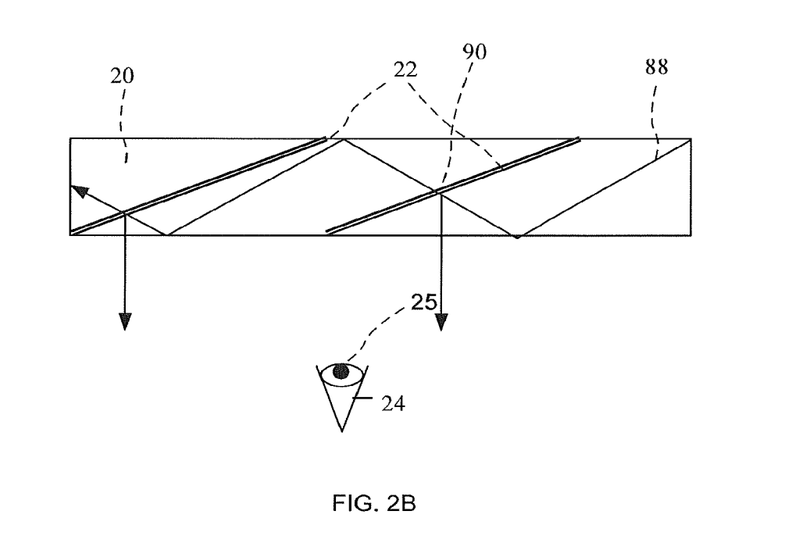

An important issue that must be considered is the actual active area of each reflecting surface. A potential non-uniformity in the resulting image might occur due to the different reflection sequences of different rays that reach each selectively reflecting surface: sonic rays arrive without previous interaction with a selectively reflecting surface; other rays arrive after one or more partial reflections. This effect is illustrated in FIG. 2A. Assuming that, for example, $\alpha_{in}=50°$, the ray 80 intersects the first partially reflecting surface 22 at point 82. The incident angle of the ray is 25' and a portion of the ray's energy is coupled out of the substrate. The ray then intersects the same selectively partially reflecting surface at point 84 at an incident angle of 75° without noticeable reflection, and then intersects again at point 86 at an incident angle of 25°, where another portion of the energy of the ray is coupled out of the substrate. In contrast, the ray 88 shown in FIG. 2B, experiences only one reflection 90 from the same surface. Further multiple reflections occur at other partially reflecting surfaces.

Figure 3:
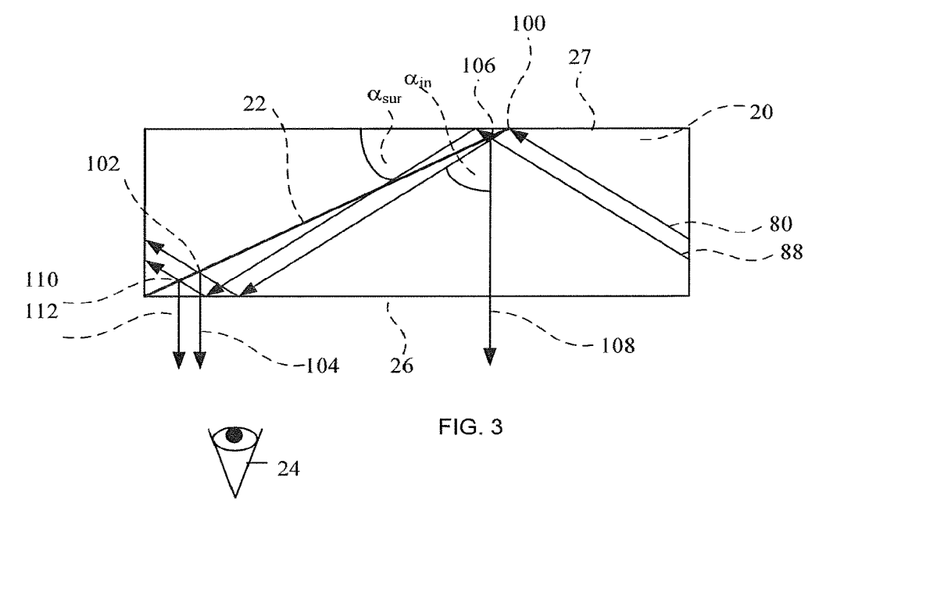
FIG. 3 is a schematic sectional-view of a reflective surface with two different impinging rays, according to the present invention.

FIG. 3 illustrates this non-uniformity phenomenon with a detailed sectional view of the partially reflective surface 22, which couples light trapped inside the substrate out and into the eye 24 of a viewer. As can be seen, the ray 80 is reflected off the upper surface 27, next to the line 100, which is the intersection of the reflecting surface 22 with the upper surface 27. Since this ray does not impinge on the reflecting surface 22, its brightness remains the same and its first incidence at surface 22 is at the point 102, after double reflection from both external surfaces. At this point, the light wave is partially reflected and the ray 104 is coupled out of the substrate 20. For other rays, such as ray 88, which is located just below ray 80, the first incidence at surface 22 is before it meets the upper surface 27, at point 106 wherein the light wave is partially reflected and the ray 108 is coupled out of the substrate. Hence, when it again impinges on surface 22, at point 110 following double reflection from the external surfaces 26, 27, the brightness of the coupled-out ray is lower than the adjacent ray 104. As a result, all the rays with the same coupled-in angle as 80 that arrive at surface 22 left of the point 102 have lower brightness. Consequently, the reflectance from surface 22 is actually "darker" left of the point 102 for this particular couple-in angle.

It is difficult to fully compensate for such differences in multiple-intersection effects nevertheless, in practice, the human eye tolerates significant variations in brightness, which remain unnoticed. For near-to-eye displays, the eye integrates the light which emerges from a single viewing angle and focuses it onto one point on the retina, and since the response curve of the eye is logarithmic, small variations, if any, in the brightness of the display will not be noticeable. Therefore, even for moderate levels of illumination uniformity within the display, the human eye experiences a high-quality image. The required moderate uniformity can readily be achieved with the element illustrated in FIG. 1. For systems having large FOVs, and where a large EMB is required, a comparatively large number of partially reflecting surfaces is required, to achieve the desired output aperture. As a result, the non-uniformity due to the multiple intersections with the large number of partially reflecting surfaces becomes more dominant, especially for displays located at a distance from the eye, such as head-up displays and the non-uniformity cannot be accepted. For these cases, a more systematic method to overcome the non-uniformity is required.

Since the "darker" portions of the partially reflecting surfaces 22 contribute less to the coupling of the trapped light waves out of the substrate, their impact on the optical performance of the LOE can be only be negative, namely, there will be darker portions it the output aperture of the system and dark stripes will exist in the image. The transparency of each one of the reflecting surfaces is, however, uniform with respect to the light waves from the external scene. Therefore, if overlapping is set between the reflective surfaces to compensate for the darker portions in the output aperture, then rays from the output scene that cross these overlapped areas will suffer from double attenuations, and darker stripes will be created in the external scene. This phenomenon significantly reduces the performance not only of displays which are located at a distance from the eye, such as head-up displays, hut also that of near-eye displays, and hence, it cannot be utilized.

Figure 4:
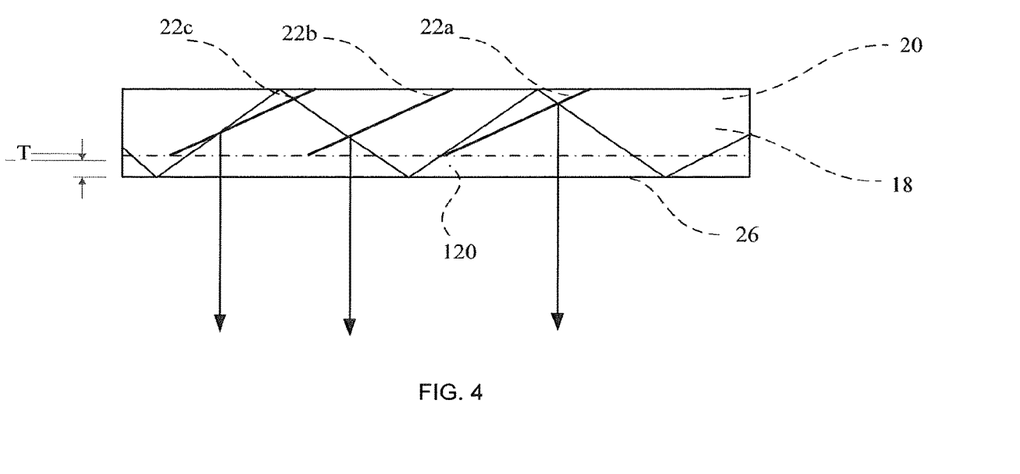
FIG. 4 illustrates a sectional view of an exemplary array of selectively reflective surfaces wherein a transparent plate is attached to the substrate edge.

FIG. 4 illustrates an embodiment for overcoming this problem. Only the "bright" portions of the partially reflecting surfaces 22a, 22b and 22c are embedded inside the substrate, namely, the reflecting surfaces 22a, 22b and 22c no longer intersect with the lower major surface 26, but terminate short of this surface. Since the ends of the reflecting surfaces are adjacent to one another over the length of the LOE, there will be no gaps in the projected image, and since there is no overlap between the surfaces there will be no gaps in the external view. There are several ways to construct this LOE, one of which is to attach a transparent plate 120 having a thickness T, preferably by optical cementing, to the active area of the substrate. In order to utilize only the active areas of the reflective surfaces 22 in the correct manner, it is important to calculate the actual active area of each partially reflective surface and the required thickness T of the plate 120.

Figure 5:
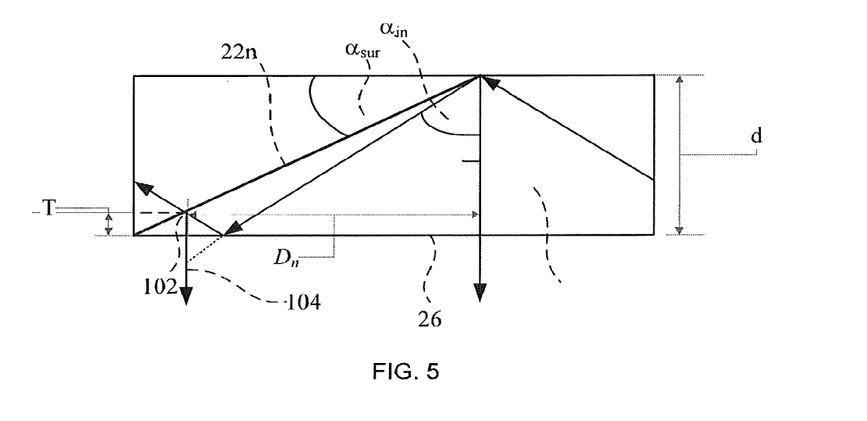
FIG. 5 is a schematic sectional-view of a reflective surface according to that present invention, illustrating the actual active aperture of the surface.

As illustrated in FIG. 5, the bright aperture $D_n$ of the reflective surface 22n in the plane of the external surface 26, as a function of the coupled-in angle $\alpha_{in}$, is:

$$D_n = \frac{2d}{\cot(\alpha_{sur}) + \cot(\alpha_{in})} \tag{4}$$

Since the trapped angle can be varied as a function of the FOV, it is important to know with which angle to associate each reflecting surface 22n, in order to calculate its active aperture.

Figure 6:
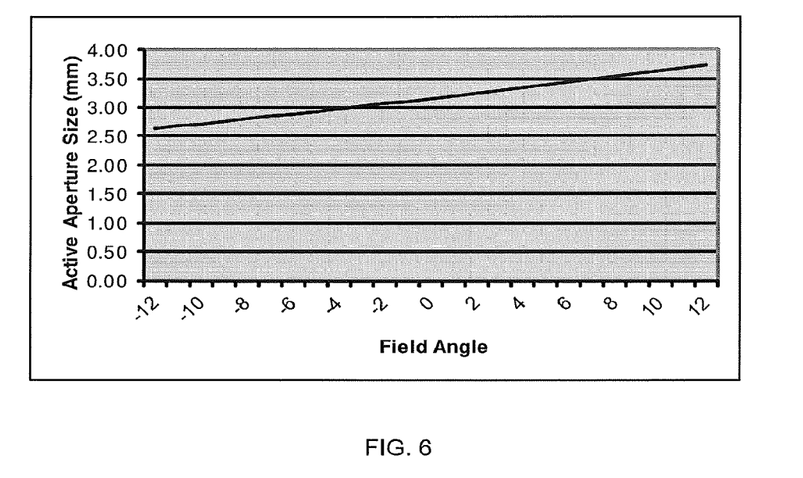
FIG. 6 illustrates the active aperture size of the reflecting surfaces as a function of the field angle, far an exemplary LOE.

FIG. 6 illustrates the active aperture as a function of the field angle for the following system parameters; substrate thickness d=2 mm, substrate refractive index v=1.51, and partially reflecting surface angle $\alpha_{sur}=64°$. In consideration of the viewing angles, it is noted that different portions of the resulting image originate from different portions of the partially reflecting surfaces.

Figure 7:
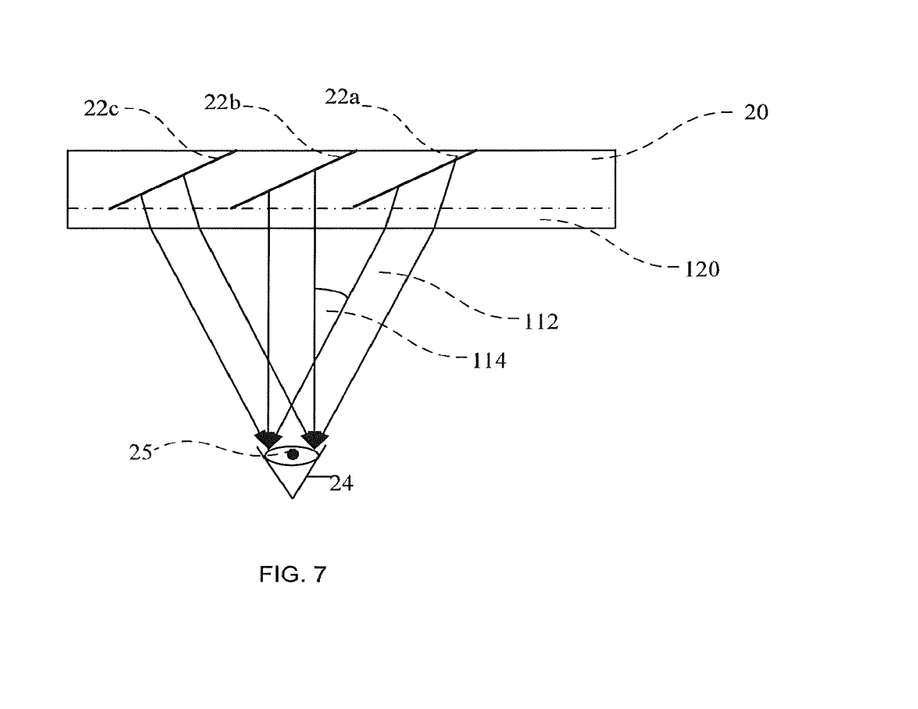
FIG. 7 illustrates detailed sectional views of the reflectance from an exemplary array of selectively reflective surfaces, for three different viewing angles.

FIG. 7, which is a sectional view of a compact LOE display system based on the proposed configuration, illustrates this effect. Here, a single plane light wave 112, representing a particular viewing angle 114, illuminates only part of the overall array of partially reflecting surfaces 22a, 22b and 22c. Thus, for each point on the partially reflecting, surface, a nominal viewing angle is defined, and the required active area of the reflecting surface is calculated according to this angle. The exact, detailed design of the active area of the various partially reflective surfaces is performed as follows: for each particular surface, a ray is plotted (taking refraction, due to Snell's Law, into consideration) from the left edge of the surface to the center of the designated eye pupil 25. The calculated direction is set as the nominal incident direction and the particular active area is calculated according to that direction.

As seen in FIG. 5, the exact values of be reflecting surfaces active areas can be used to determine the various distances T between the left edge 102 of the bright part of each reflecting surface 22$_n$ and the lower surface 26. A larger active area dictates a smaller inter-surface distance. This distance represents the thickness of the plate 120 (FIG. 7) that should be attached to the lower surface of the LOE. As illustrated in FIG. 5, the distance T as a function of the coupled-in angle is:

$$T = d - D_n \cdot (\alpha_{sur}) \quad (5)$$

Figure 8:
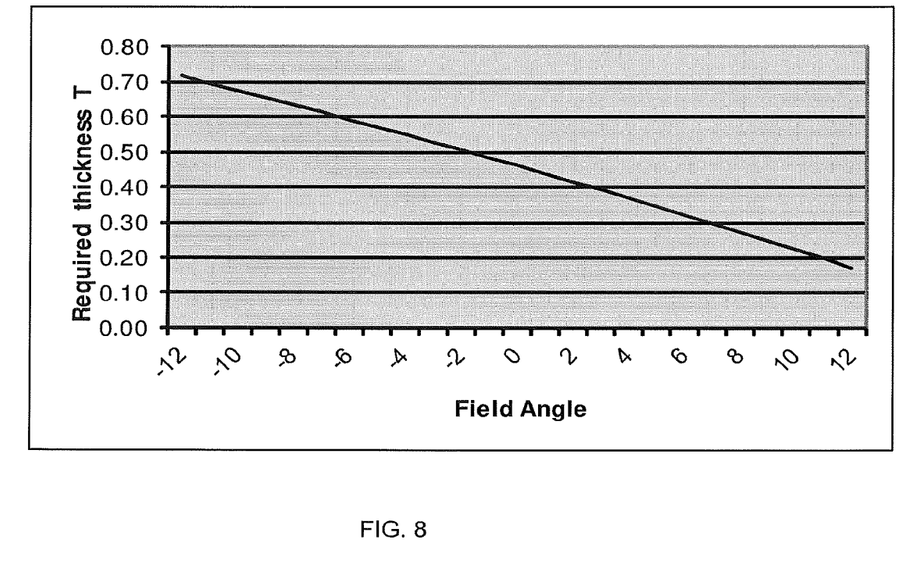
FIG. 8 illustrates the required distance between two adjacent reflecting surfaces as a function of the field angle, for an exemplary LOE.

FIG. 8 illustrates the required thickness T of the plate 120 as a function of the field angle, for the same parameters as set above in reference to FIG. 6. It is worthwhile setting the thickness T as the maximal calculated value to assure that the phenomenon of dark stripes will be avoided in the image. Setting a too thick plate 120 will cause an opposite effect, namely, the appearance of bright stripes in the image.

Figure 9:
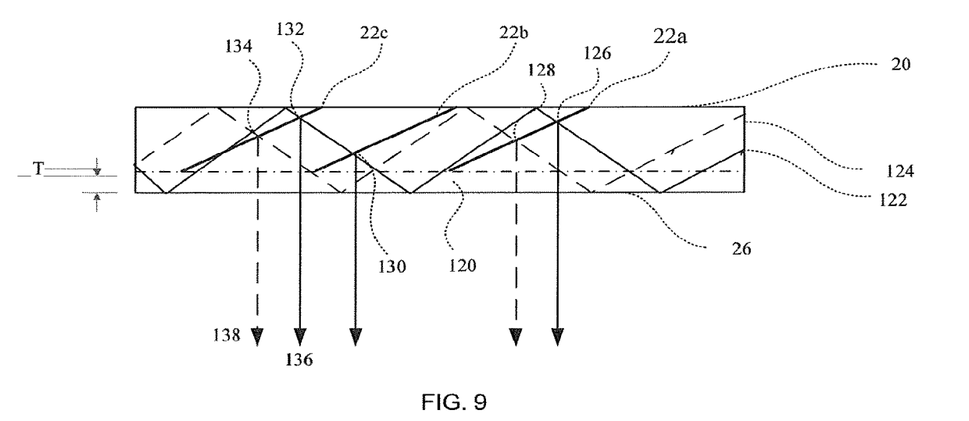
FIG. 9 is another schematic sectional-view of a reflective surface with two different impinging rays, according to the present invention.

As illustrated FIG. 9, two light rays, 122 and 124, are coupled inside the substrate 20. The two rays are partially reflected from surface 22a at points 126 and 128, respectively. Only ray 122, however, impinges on the second surface 22b at point 130 and is partially reflected there, while ray 124 skips over surface 22b without any reflectance. As a result, the brightness of ray 124, which impinges on surface 22c at point 134, is higher than that of ray 122 at point 132. Therefore, the brightness of the coupled-out ray 138 from point 134 is higher than that of ray 136 which is coupled-out from point 132, and a bright stripe will appear in the image. Consequently, an exact value of the thickness T should be chosen to avoid dark as well as bright stripes in the image.

Figure 10:
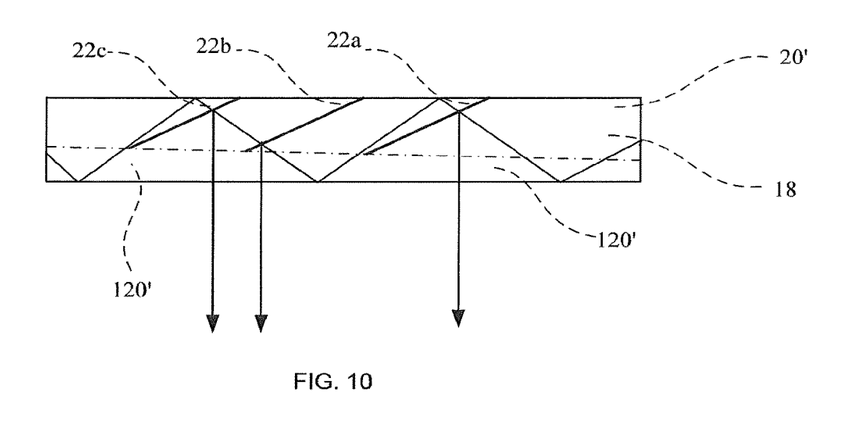
FIG. 10 illustrates a sectional view of an exemplary array of selectively reflective surfaces having a wedged transparent plate is attached to the substrate edge.

As illustrated in FIG. 10, a possible embodiment for achieving the required structure, wherein the thickness T of the plate 120 depends on the viewing angle, is to construct a wedged substrate 20', wherein the two major surfaces are not parallel. A complementary transparent wedged plate 120' is attached to the substrate, preferably by optical cementing, in such a way that the combined structure forms a complete rectangular parallelepiped, i.e., the two outer major surfaces of the final LOE arc parallel to each other. There are, however, some drawbacks to this method. First of all, the fabrication process of the wedged LOE is mare complicated and cumbersome than the parallel one. In addition, this solution is efficient for systems having small EMB, wherein there is a good matching between the viewing angle and the lateral position on the substrate plane. For systems having a large EMB, however, namely, wherein the eye can move significantly along the lateral axis, there will be no good adjustment between the viewing angle and the actual thickness of the plate 120'. Hence, dark or bright stripes may be seen in the image.

Figure 11:
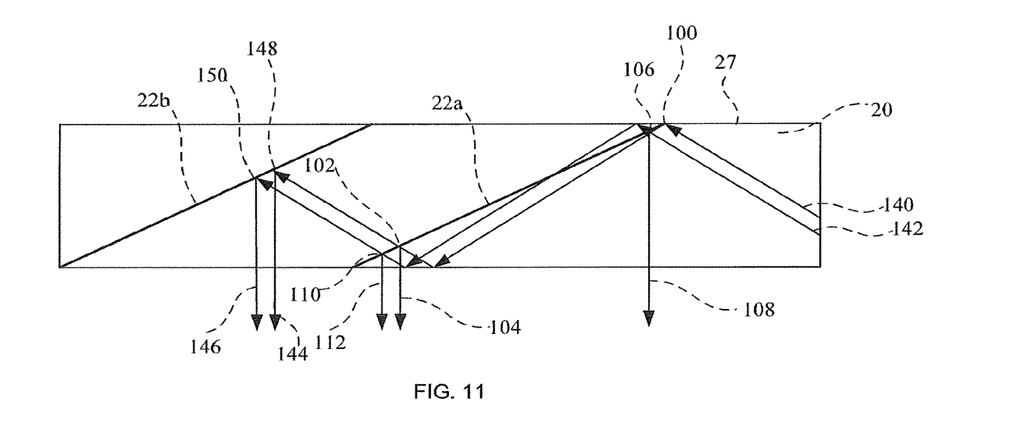
FIG. 11 is another schematic sectional-view of a reflective surface with two different impinging rays, according to the present invention, wherein the two rays are reflected from two partially reflecting surfaces.

This occurrence of dark or bright stripes due to the structure of the partially reflective surfaces in the LOE is not limited to the surface which creates this phenomenon. As illustrated with reference to FIG. 3, the brightness of the coupled ray 88, which is reflected twice by surface 22a, is lower at point 110 than that of ray 80, which is reflected only once from surface 22a at point 102, As a result, the brightness of the reflected wave 112 is lower than that of the adjacent ray 104. As illustrated in FIG. 11, however, not only the brightness of the reflected wave from surface 22a is different, hut also the brightness of the transmitted rays 140 and 142 is different. As a result, the brightness of the reflected rays 144 and 146 from surface 22b, at points 148 and 150, respectively, will be different in the same way and a dark stripe will be created also at this region of the image, as well. Naturally, this dissimilarity between the rays will continue to propagate in the LOE to the next partially reflective surfaces. As a result, since each partially reflective surface creates its own dark or bright stripes, according to the exact incident angle, for an LOE having a large number of partially reflecting surfaces, a large amount of dark and bright stripes will be accumulated at the far edge of the output aperture of the LOE, and consequently, the image quality will be severely deteriorated.

Figure 12:
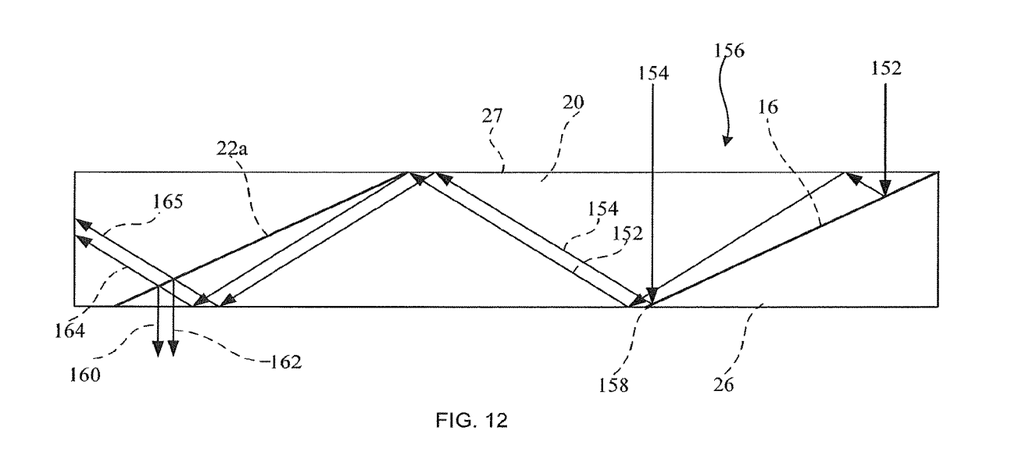
FIG. 12 is yet another schematic sectional-view of a reflective surface with two different impinging rays, according to the present invention, wherein the two rays are coupled into the LOE remotely located and coupled-out of the LOE adjacent to call other.

Another source for unevenness of the image can be the non-uniformity of the image waves which are coupled into the LOE. Usually, when two edges of a light source have slightly different intensities this will hardly be noticed by the viewer, if at all. This situation is completely different for an image which is coupled inside a substrate and gradually coupled-out, like in the LOE. As illustrated in FIG. 12, two rays 152 and 154 are located at the edges of the plane wave 156, which originates from the same point in the display source (not shown). Assuming that the brightness of ray 152 is lower than that of ray 154 as a result of a non-perfect imaging system, this non equality will hardly be seen by direct viewing of the plane wave 156 because of the remoteness between the rays. However, after being coupled into the LOE 20, this condition is changed. While the ray 154 illuminates the reflecting surface 16 just right to the interface line 156 between the reflecting surface 16 and the lower major surface 26, the right ray 152 is reflected from surface 16, totally reflected from the upper surface 27, and then impinges on the lower surface 26 just left to the interface line 158. As a result, the two rays 152 and 154 propagate inside the LOE 20 adjacent to each other. The two exit rays 160 and 162, which originated from rays 152 and 154, respectively, and reflected from surface 22a, have accordingly different brightness. Unlike the input light wave 156, however, the two different rays are adjacent to each other, and this dissimilarity will easily be seen as a dark stripe in the image. These two rays 164, 165 will continue to propagate together, adjacent to each other, inside the LOE and will create a dark stripe at each place that they will be coupled out together. Naturally, the best way to avoid this unevenness is to assure that all the coupled light waves into the LOE have a uniform brightness over the entire input aperture for the entire FOV. This demand might be very difficult to fulfil for systems having large FOV as well as wide input apertures.

Figure 13A:
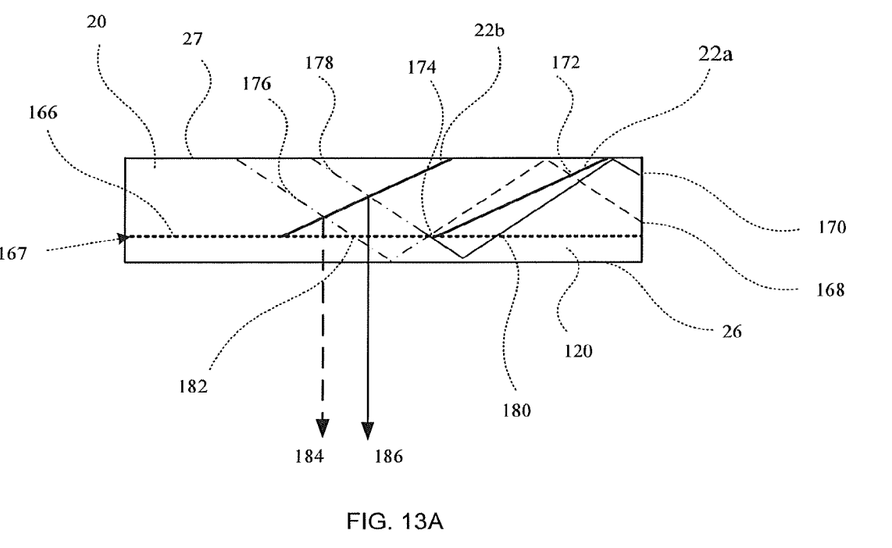
FIGS. 13A and 13B are schematic sectional-views of a beam splitting surface embedded inside a light-guide optical element.
Figure 13B:
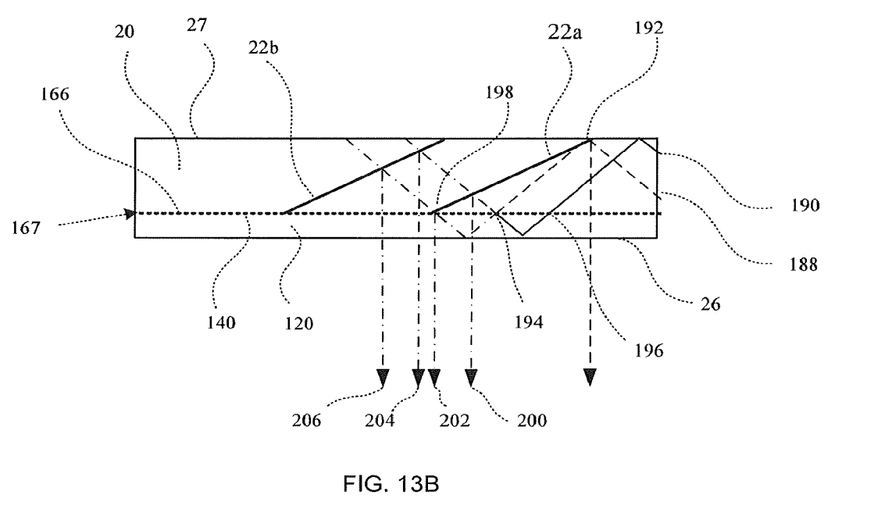

As illustrated it FIGS. 13A and 13B, this unevenness problem may be solved by attaching a transparent plate to one of the major surfaces of the LOE, as described above with reference to FIG. 4. In this embodiment, however, a beam splitting coating 166 is applied to the interface plane 167 between the LOE 20 and the transparent plate 120. As illustrated in FIG. 13A, two light rays, 168 and 170, are coupled inside the substrate 20. Only ray 168 impinges on the first partially reflective surface 22a at point 172 and is partially reflected there, while ray 170 skips over surface 22a, without any reflectance. As a result, assuming that the two rays have the same brightness while coupled into the LOE, ray 170 which is reflected upward from the lower major surface 26 has a higher brightness then ray 168 which is reflected downward from the upper surface 27. These two rays intersect each other at point 174, which is located at the interface plane 167. Due to the beam splitting coating which is applied thereto, each one of the two intersecting rays is partially reflected and partially passes through the coating. Consequently, the two rays interchange energies between themselves and the emerging rays 176 and 178 from the intersection point 174 have a similar brightness, which is substantially the average brightness of the two incident rays 168 and 170. In addition, the rays exchange energies with two other rays (not shown) at intersection points 180 and 182. As a result of this energy exchange, the two reflected rays 184 and 186 from surface 22b will have substantially similar brightness and the bright stripe effect will be significantly improved.

Similarly, as illustrated in FIG. 13B, two light rays, 188 and 190, are coupled inside the substrate 20. Only ray 188, however, impinges on the first partially reflective surface 22a at point 192 and partially reflected there before being reflected by the upper surface 27. As a result, assuming that the two rays have the same brightness while coupled into the LOE, ray 190 which is reflected downward from the upper major surface 27, has a higher brightness then ray 188. These two rays, however, intersect each other at point 194 which is located at the interface plane 167 and exchange energies there. In addition, these two rays intersect with other rays at the points 196 and 198 which are located on the beam splitting surface 167. As a result, the rays 200 and 202 which are reflected from surface 22a and consequentially the rays 204 and 206 which are reflected from surface 22b, will have substantially the same brightness, and therefore, the dark stripes effect will be significantly decreased. This improved uniformity of brightness effect is applicable also for dark and bright stripes, which are caused by a non-uniform illumination at the input aperture of the LOE. As a result, the brightness distribution of the optical waves, which is trapped inside the LOE, is substantially more uniform over the output aperture of the LOE than over the input aperture.

As illustrated in FIG. 13A the light rays 184, 186, which are reflected from surface 22a, intersect with the beam splitting surface 167, before being coupled out from the LOE. As a result, a simple reflecting, coating cannot be easily applied to surface 167 since this surface should also be transparent to the light-waves that exit the substrate 20 as well as transparent to the light wave from the external scene for see-through applications, namely, the light-waves should pass through plane 167 at small incident angles, and be partially reflected at higher incident angles. Usually, the passing incident angles are between 0° and 15° and the partially reflecting incident angles are between 40° and 65°. In addition, since the light rays cross the interface surface 167 many times while propagating inside the LOE, the absorption of the coating should be negligible. As a result, a simple metallic coating cannot be used and a dielectric thin-film coating, having a high transparency has to be utilized.

Figure 14:
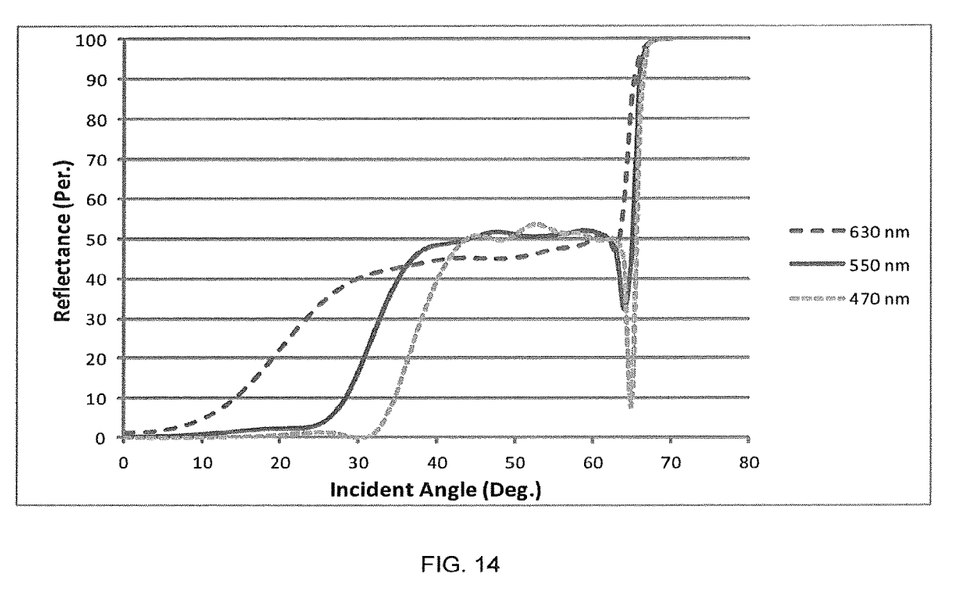
FIG. 14 is a graph illustrating reflectance curves of a beam splitting surface as a function of incident angles, for an exemplary angular sensitive coating for s-polarized light-waves.

FIG. 14 illustrates for s-polarization the reflectance curves as functions of the incident angles for three representative wavelengths in the photopic region: 470 nm, 550 nm and 630 nm. As illustrated, it is possible to achieve the required behavior of partial reflectance (between 45% and 55%) at large incident angles between 40° and 65° and low reflectance (below 5%) at small incident angles, for s-polarized light-waves. For p-polarized light-waves, it is impossible to achieve substantial reflectance at incident angles between 40° and 65°, due to the proximity to the Brewster angle. Since the polarization which is usually utilized for an LOE-based imaging system, is the s-polarization, the required beam splitter can be fairly easily applied. However, since the beam splitting coating should be substantially transparent for light waves from the external scene which impinge on the interface surface at low incident angles and which are substantially non-polarized, the coating should have low reflectance (below 5%) at small incident angles also for p-polarized light waves.

A difficulty still existing is that the LOE 20 is assembled from several different components. Since the fabrication process usually involves cementing optical elements, and since the required angular-sensitive reflecting coating is applied to the light-guide surface only after the body of the LOE 20 is complete, it is not possible to utilize the conventional hot-coating procedures that may damage the cemented areas. Novel thin-film technologies, as well as ion-assisted coating procedures, can also be used for cold processing. Eliminating the need to heat parts, allows cemented parts to be safely coated. An alternative is that the required coating can simply be applied to transparent plate 120, which is adjacent to the LOE 20, utilizing conventional hot-coating procedures and then cementing it at the proper place. Clearly, his alternative approach can be utilized only if the transparent plate 120 is not too thin and hence might be deformed during the coating process.

Figure 15:
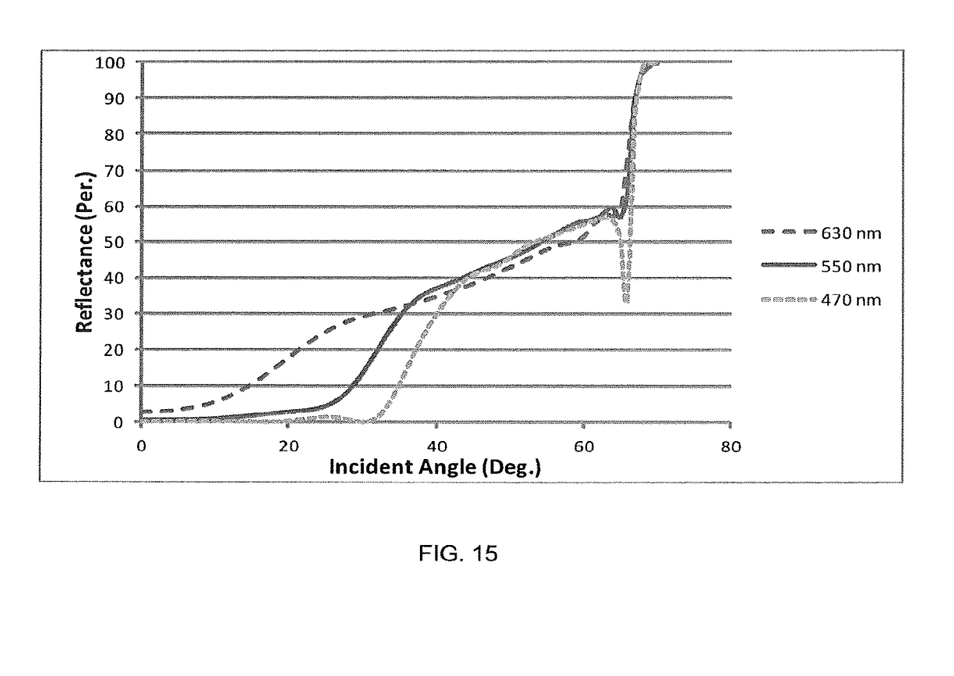
FIG. 15 is a further graph illustrating reflectance curves of a beam splitting surface as a function of incident angles, for an exemplary angular sensitive coating for s-polarized light-waves.
Figure 16:
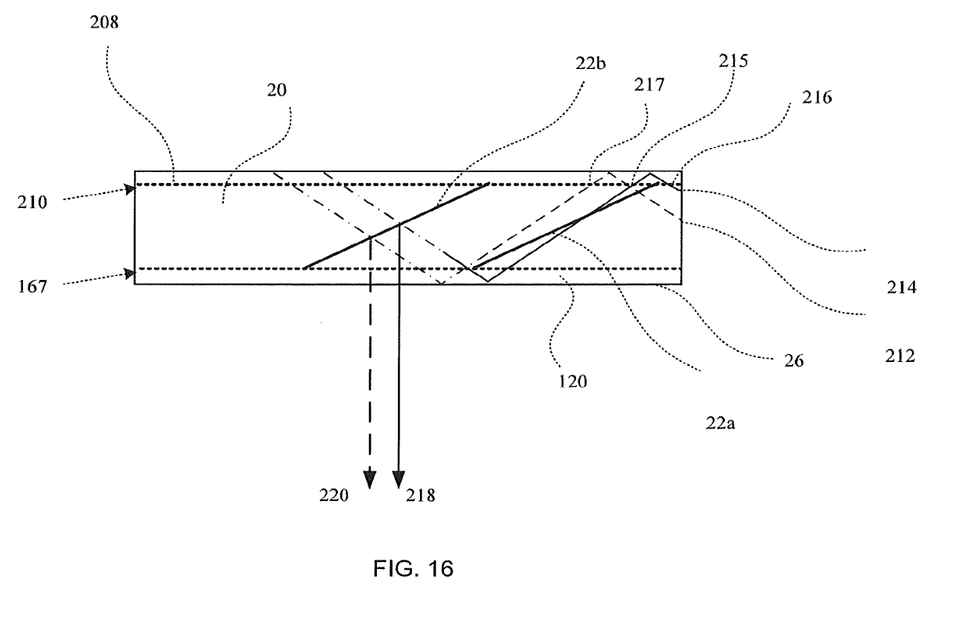
FIG. 16 is a schematic sectional-view of two different beam splitting surfaces embedded inside a light-guide optical element.
Figure 17:
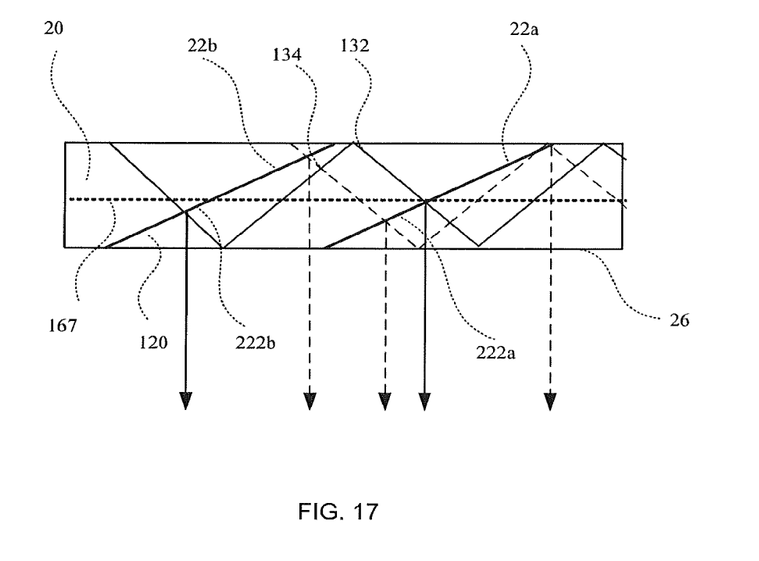
FIG. 17 is another schematic sectional-view of a beam splitting surface embedded inside a light-guide optical element wherein partially reflecting surfaces are fabricated inside the transparent attached plate.

There are some issues that should be taken into consideration while designing a beam splitting, mechanism as illustrate above:

a. Since the rays which are trapped inside the LOE are not only totally reflected from the major surfaces 26 and 27, but also from the internal partially reflecting interface plane 167. It is important that all three of these surfaces will be parallel to each other to ensure that coupled rays will retain their original coupling-M direction inside the LOE.

b. As illustrated in FIGS. 13A and 13B, the transparent plate 120 is thinner than the original LOE 20, Unlike the considerations which were brought regarding to the uncoated plate in FIGS. 7-10, wherein the thickness of plate 120 is important for uniformity optimization, however, here the thickness of the coated plate might be chosen according to other considerations. On one hand, it is easier to fabricate, coat and cement a thicker plate. On the other hand with a thinner plate the effective volume of the LOE 20, which is practically coupled the light waves out of the substrate, is higher for a given substrate thickness. In addition, the exact ratio between the thicknesses of the plate 120 and the LOE 20 might influence the energy interchange process inside the substrate.

c. Usually, for beam splitters which are designated for full color images the reflectance curve should be as uniform as possible for the entire photopic region, in order to abort chromatic effects. Since, however, in the configurations which are illustrated in the present invention the various rays intersect with each other many times before being coupled out from the LOE 20, this requirement is no longer essential. Naturally, the beam-splitting coating should take into account the entire wavelengths spectrum of the coupled image, but the chromatic flatness of the partially reflecting curve may be tolerated according to various parameters of the system.

d. The reflectance-transmittance ratio of the beam-splitting coating should not necessarily be 50%-50%. Other ratios may be utilized in order to achieve the required energies exchange between the darker and the brighter rays. Moreover, as illustrated in FIG. 15, a simpler beam-splitter coating can be utilized, wherein the reflectance is gradually increased from 35% at art incident angle of 40° to 60% at an incident angle of 65°.

e. The number of the beam-splitting surfaces which are added to the LOE is not limited to one. As illustrated in FIG. 16, another transparent plate 208 may be cemented to the upper surface of the LOE, wherein a similar beam-splitting coating is applied to the interface plane 210 between the LOE 20 and the upper plate 208, to form an optical device with two beam splitting, surfaces. Here, the two unequal rays 212 and 214 intersect with each other at point 215 on the coated interface plane 210 along with other intersections with other rays at points 216 and 217. This is in addition to the intersections on the lower beam-splitting interface plane 167. As a result, it is expected that the uniformity of the reflected rays 218 and 220 will be even better than that of the embodiments of FIGS. 13A and 13B. Naturally, the fabrication method of the LOE having two beam-splitting interface planes is more difficult than that of having only a single plane. Therefore, it should be considered only for systems wherein the non-uniformity problem is severe. As before, it is important that all of the four reflecting surfaces and planes 26, 27, 167 and 210, should be parallel to each other.

f. The transparent plate 120 should not be necessarily fabricated from the same optical material as the LOE 20. Furthermore, the LOE might be fabricated of a silicate based material while, for the sake of eye safety, the transparent layer may be fabricated of a polymer based material. Naturally, care should be taken to ensure optical qualities of the external surfaces and to avoid deformation of the transparent plate.

g. So far it was assumed that the transparent plate is totally blank. However, as illustrated in FIG. 17, partially reflecting surfaces 222a and 222b, may be fabricated inside the plate 120, in order to increase the useable volume of the LOE. These surfaces should be strictly parallel to the existing surfaces 22a and 22b and oriented at exactly the same orientation.

All the various parameters of the above embodiments, such as, the thickness and the optical material of the plate 120, the exact nature of the beam-splitting coating, the number of the beam-splitting surfaces and location of the partially reflecting surface inside the LOE, could have many different possible values. The exact values of these factors are determined according to the various parameters of the optical system as well as the specific requirements for optical quality and fabrication costs.

Figure 18A:
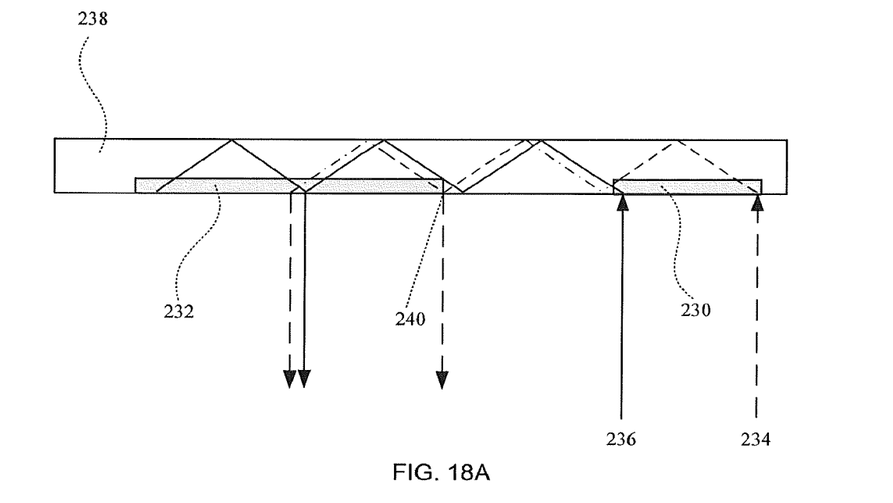
FIGS. 18A and 18B are yet further schematic sectional-views of embodiments of a beam-splitting surface embedded inside a light-guide optical element wherein the coupling in, as well as the coupling-out elements are diffractive optical elements.

So far, it was assumed that the light waves are coupled out from the substrate by partially reflecting surfaces, which are oriented at an oblique angle in relation to the major surfaces, and usually coated with a dielectric coating. As illustrated in FIG. 18A, however, there are systems wherein the light waves are coupled into and out from the substrate utilizing diffractive elements 230 and 232, respectively. The same uniformity issues that were discussed above should also be relevant to this configuration. As illustrated, the two rays 234 and 236 from the same point in the display source are coupled into the substrate 238 remotely located from each other at the two edges of the coupling-in element 230. The rays are coupled-out by the coupling-out element 232 located adjacent to each other. Therefore, any dissimilarity between the rays will be easily seen in the coupled-out wave. In addition, in order to validate a uniformed coupled-out image the diffractive efficiency of the coupling-out element 232 is increased gradually. As a result, different rays from the same point source might pass through different locations in the element 232 before being coupled-out the element and hence will have different brightness in the image. Another source for the unevenness can be caused by the fact that the ray 234 is partially diffracted out of the substrate at the right edge 240 of the grating 232 while ray 236 impinges on the lower surface just left of the grating, and hence, is not diffracted there. As a result, for all the coupling-out locations in the grating 232 for the two adjacent rays 234 and 236, ray 236 will have a higher brightness and this difference will easily be seen.

Figure 18B:
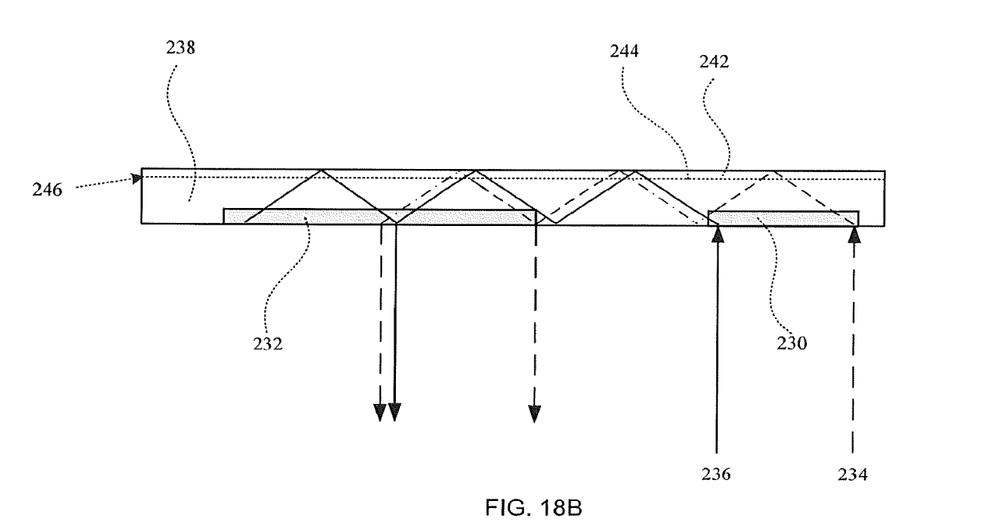

FIG. 18B illustrates a similar approach to solve these issues. As illustrated, a transparent plate 242 is cemented to the upper surface 244 of the substrate 238, wherein the interface surface 246 is coated with a beam-splitting coating similar to the above-described coatings.

What is claimed is:

1. An optical system comprising:
a waveguide having a pair of parallel surfaces for guiding light by internal reflection;
an input coupler, wherein the input coupler is configured to couple light corresponding to a collimated image into the waveguide so as to propagate within the waveguide by total internal reflection;
an output coupler, wherein the output coupler is configured to couple the light out of the waveguide; and
a partially reflective element parallel to, between and separated from, the pair of parallel surfaces, the partially reflective element at least partially overlapping the input coupler,
wherein the partially reflective element is partially reflective and partially transmissive for light of each of at least three wavelengths propagating within the waveguide, the at least three wavelengths including 470 nm, 550 nm and 630 nm, and is deployed such that, after the input coupler, for each wavelength of light, the light impinges on the partially reflective element which transmits a first portion of the light so that the first portion of the light is next reflected at a first of the parallel surfaces and reflects a second portion of the light so that the second portion of the light is next reflected at a second of the parallel surfaces.

2. The optical system of claim 1, wherein the output coupler is integrated with the waveguide.

3. The optical system of claim 1, wherein the output coupler is located on one of the parallel surfaces of the waveguide.

4. The optical system of claim 1, wherein the output coupler is integrated internally within a thickness of the waveguide.

5. The optical system of claim 1, wherein the output coupler comprises a set of mutually-parallel partially-reflecting surfaces oriented obliquely to a major surface of the waveguide.

6. The optical system of claim 1, wherein the partially reflective element at least partially overlaps the output coupler.

7. The optical system of claim 1, wherein said input coupler and said output coupler comprise a diffractive grating.

8. The optical device according to claim 1, wherein the partially reflective element has a first reflectance for light propagating by internal reflection within the waveguide and a second reflectance, lower than the first reflectance, for light from an external scene passing through the waveguide.

9. The optical system of claim 1, wherein the partially reflective element is formed by a beam-splitting coating.

10. The optical device according to claim 9, wherein said beam-splitting coating is a dielectric coating.

11. The optical device according to claim 1, wherein said partially-reflective element is one of a plurality of partially reflective elements.

12. The optical device according to claim 11, wherein the partially reflective elements have a first reflectance for light propagating by internal reflection within the waveguide and a second reflectance, lower than the first reflectance, for light from an external scene passing through the waveguide.

13. The optical system of claim 11, wherein the waveguide comprises a plurality of waveguide substrates.

14. The optical device according to claim 13, wherein the partially reflective elements have a first reflectance for light propagating by internal reflection within the waveguide and a second reflectance, lower than the first reflectance, for light from an external scene passing through the waveguide.

15. The optical system of claim 13, wherein the waveguide comprises first and second waveguide substrates and the partially reflective element is implemented as a layer between the first and second waveguide substrates.

16. The optical system of claim 15, wherein the layer comprises a beam-splitting coating on a surface of the first or second waveguide substrate.

17. The optical device according to claim 16, wherein said beam-splitting coating is a dielectric coating.

* * * * *